United States Patent [19]

Seaton

[11] Patent Number: 4,468,773

[45] Date of Patent: Aug. 28, 1984

[54] LASER CONTROL APPARATUS AND METHOD

[76] Inventor: Norman T. Seaton, 2821 9th St., Berkeley, Calif. 94710

[21] Appl. No.: 268,399

[22] Filed: May 29, 1981

[51] Int. Cl.³ .............................................. H01S 3/13
[52] U.S. Cl. ..................................... 372/32; 372/18; 372/19; 372/20; 372/28; 372/38
[58] Field of Search ...................... 372/29, 18, 19, 25; 376/30–32, 26

[56] References Cited

U.S. PATENT DOCUMENTS

| 3,437,955 | 4/1969  | Enloe et al. ........................ | 372/29  |
| 3,453,557 | 7/1969  | Polanyi et al. ...................... | 372/32  |
| 3,622,908 | 11/1971 | Skolnick ............................. | 372/32  |
| 3,649,930 | 3/1972  | Le Floch ............................ | 331/94.5 |
| 3,714,463 | 1/1973  | DeLaune ............................ | 307/232 |
| 3,735,269 | 5/1973  | Jackson ............................. | 328/14  |
| 3,771,066 | 11/1973 | Burgwald et al. ................... | 372/20  |
| 3,889,207 | 6/1975  | Burgwald et al. ................... | 372/32  |

FOREIGN PATENT DOCUMENTS 1448676  9/1976  United Kingdom .

OTHER PUBLICATIONS

Publication: "Fast Frequency Stabilization of a CW Dye Laser", R. L. Barger, J. B. West & T. C. English, Appl. Phys. Letters 27, 31 (1975).
Publication: "Frequency Stability of He-Ne Masers and Measurements of Length", Jaseja, Javan, Townes, Phys. Rev. Letters 10, 165, (1963).
Publication: "Frequency Stabilization of Gas Lasers", A. D. White, I.E.E.E. J. Quantum Electronics OE-1, 349, (1965).
Publication: "Gas Laser in a Magnetic Field", M. I. D'Yakonov and S. A. Fridrikhov, Soviet Physics US-PEKHI 9, 837, (1967).
Publication: "Comments on: Frequency Stabilization of Internal Mirror He-Ne Lasers", S. J. Bennett, R. E. Ward, D. C. Wilson, Appl. Optics 12, 1406, (1973).
Publication: "Frequency Stabilization of Internal Mirror He-Ne Lasers in a Transverse Magnetic Field", R. H. Morris, J. B. Ferguson, and J. S. Warniak, Appl. Optics 14, 2808, (1975).
Publication: "Stabilized ³He-²⁰Ne Transverse Zeeman Lasers", N. Umeda, M. Tsukiji, and H. Takasaki, Appl. Optics 19, 442, (1980).
Publication: "Molecular Beam Stabilized Multiwatt Argon Lasers", L. A. Hackel, R. P. Hackel, and S. Ezekiel, Metrologia 13, 141, (1977).

Primary Examiner—William L. Sikes
Assistant Examiner—Léon Scott, Jr.
Attorney, Agent, or Firm—Manfred M. Warren; Robert B. Chickering; Glen R. Grunewald

[57] ABSTRACT

A laser control apparatus for use with a laser having output radiation including an intermodal beat frequency and electric signal responsive means for controlling the light frequency from the laser; radiation responsive electric signal means adapted for association with said radiation for providing an electric signal having a frequency as a function of said beat frequency; and means for sensing changes in phase of the aforementioned signal and providing a second electric signal varying as a function thereof and being adapted for connection to the electric signal responsive means. The apparatus also includes a phase comparator and circuitry providing a phase lock of the first-named and reference signals.

8 Claims, 8 Drawing Figures

LASER CONTROL APPARATUS AND METHOD

BACKGROUND OF THE INVENTION

1. Field of the Invention

The invention relates to lasers and is particularly directed to a feedback control system for stabilizing the light frequency of a laser.

2. Description of the Prior Art

The laser has found wide application as a research tool for fundamental investigations into the properties of nature. The extra-ordinary spatial and temporal coherence of some types of gas laser beams in particular has enabled the laser to find wide application in the field of metrology, and as an element in the control of various high precision laser systems (R. L. Barger, J. B. West, and T. C. English, Appl. Phys. Letters 27, 31 (1975)).

It has long been known that gas lasers are capable of emitting single frequency light waves of phenomenal stability in frequency. For example, Jaseja, Javan, and Townes, Phys. Rev. Letters 10, 165, (1963), observed under virtually ideal laboratory conditions fluctuations of as little as a few tens of cycles per second in a light frequency of $3 \times 10^{14}$—i.e a stability of one part in $10^{13}$. Such stabilities correspond to fluctuations on the mirror-to-mirror separation of only 1/2000 of the diameter of a hydrogen atom, or 1/20,000,000 of a wavelength, and can obviously only be obtained in the complete absence of vibration and temperature fluctuations. On the other hand, the stabilities observed with say a typical HeNe laser under typical laboratory conditions are limited to about 1 part in $10^6$, and most such lasers put out within the Doppler gain profile several very closely spaced frequencies, differing usually by 500 to 800 MHz. These properties make such simple inexpensive lasers unsuited to many applications in metrology and related control systems.

The scientific and patent (A. D. White, I.E.E.E. J. Quantum Electronics QE-1, 349, (1965); M. I. D'Yakonov and S. A. Fridikhov, Soviet Physics USPEKHI 9, 837, (1967); S. J. BENNETT, R. E. Ward, and D. C. Wilson, Appl. Optics 12, 1406, (1973); R. H. Morris, J. B. Ferguson, and J. S. Warniak, Appl. Optics 14, 2808, (1975); N. Umeda, M. Tsukiji, and H. Takasaki, Appl. Optics 19, 442, (1980); T. G. Polanyi and I. Tobias, U.S. Pat. No. 3,453,557 (1969); M. L. Skolnick, U.S. Pat. No. 3,622,908 (1971); A. Le Floch, U.S. Pat. No. 3,649,930 (1972); G. M. Burgwald, W. M. Kruger, and D. L. Hammond, U.S. Pat. No. 3,771,066 (1973), U.S. Pat. No. 3,889,207 (1975)) literature contains many active stabilization schemes for attaining single frequency and/or frequency stable operation. These vary from the very simple scheme described, S. J. Bennett, R. E. Ward, and D. C. Wilson, Appl. Optics 12, 1406 (1973), and patented, S. J. Bennett, and D. C. Wilson, British Pat. No. 1,448,676 (1974), by Bennett, to the complicated and sophisticated systems more recently described by Hackel, Hackel, and Ezekiel, Metrologia 13, 141 (1977). Under typical laboratory conditions, the scheme of Bennett achieved a short-term stability of about 3 MHz and a long-term stability of +5 MHz, while the latter authors were able to reduce short term fluctuations down to the order of 20 to 60 kHz with long-term stabilities of the order of 1 part in $10^{13}$.

The techniques of the present invention, when used with the relatively simple transverse Zeeman laser, R. H. Morris, J. B. Ferguson, and J. S. Warnick, Appl. Optics 14, 2808 (1975), will produce short-term stabilities similar to those obtained by the latter authors, and long-term stabilities substantially better than those heretofore obtained in small relatively inexpensive actively controlled lasers. At the same time, great versatility in useful operating modes is obtained.

While in principle, the light frequency of a laser can be held constant to a phenomenal degree, the light frequency of typical laboratory lasers is found to undergo very much larger erratic short-term excursions as well as more gradual long-term excursions. The short-term excursions manifest themselves as a broadened frequency spread or linewidth about the central light frequency, and the long-term excursions are seen as drifts in the light frequency itself. The recent development of tunable dye lasers, in which the laser light frequency can be varied in a controlled manner, has made possible many new laser applications in high-resolution spectroscopy. Such applications call for very precise tuning and very narrow spectral linewidth of the laser output beam, which can be provided only by an extremely stable laser.

A laser operated under typical laboratory conditions is subjected to numerous sources of short and long term frequency fluctuations. The operating frequency of the laser is selected by a resonant chamber or cavity tuned to resonate at a frequency within the range for which the laser can sustain its lasing action. Minute changes in the resonant length of the cavity will produce corresponding changes in the light frequency. For example, a short-term frequency stability of one part in $10^9$, attainable by the most stable of the commercially available lasers, corresponds to a change in a 30-cm cavity of only $3 \times 10^{-8}$ cm. Resonant length variations of this magnitude can easily be induced by ambient vibrations from nearby equipment, wind-induced motion of the laboratory and above all by temperature variations. For example such small changes in cavity length can be induced by temperature fluctuations of the order of 1/50,000 part of a degree, such as can be generated by micro-turbulence resulting from heating-cooling fluctuations of the resonant cavity. In addition, there are other sources of bothersome frequency jitter which are not directly related to resonant-length variations, such as plasma disturbances within the cavity generated by fluctuations in the laser discharge current density, and partition noise generated by the stochastic distribution of decay pathways. Finally, there is the problem of retro-reflection, of which more is said at the conclusion of this introduction.

Various methods have been devised to reduce the frequency excursions of a laser output. In the passive approach, the laser is typically supported on a massive shock-mounted table and operated under stringently controlled laboratory conditions, usually in an isolated location, to eliminate as much as possible all sources of ambient vibration, sound, electrical current variations and especially temperature variations. Although this approach can provide remarkable short-term and long-term laser stability, it has the obvious drawback of requiring elaborate laboratory preparations impractical for most laser applications.

A common approach to obtaining laser stability is to direct a small part of the laser beam to a reference cavity or to an absorption cell and to use a a feedback servo-system to actively adjust the optical path length of the laser resonant cavity to correspond with optimum transmission or absorption, respectively.

In another common approach a feedback servosystem actively adjusts the optical path length of the laser resonant cavity, hence the resonant frequency, in response to a correction signal derived from the laser output radiation by means of synchronous detection. For example, in the scheme of U.S. Pat. No. 3,649,930 illustrating this approach, an alternating magnetic field is imposed on the laser in such a manner as to produce a modulation of the output light intensity. Variations of the modulated light beam are compared with the corresponding variations of the applied magnetic field inducing the modulation in the first instance by means of a synchronous detector, and the output signal therefrom is applied to a piezoelectric element controlling the position of one of the laser cavity mirrors.

A serious drawback inherent in any such synchronous-detection scheme is the inability to control frequency excursions occurring over a time interval less than the period of the applied modulating signal. The advantages of higher-frequency applied modulation can be lost, however, unless other delays in the system can be correspondingly reduced, most notably, the delay inherent in the transducer for adjusting the resonant optical path length of the laser. Moreover, the greatest stabilities achieved by this method are typically at a cost restriction to commercial profitability.

Another source of frequency shift of significance in virtually all active stabilization schemes is the reflection and scattering of the laser's own light back into the laser cavity—a phenomenon referred to herein as retro-reflection. Retro-reflected light causes the operating frequency of the laser to shift by an amount that depends on the amplitude and phase of the light re-entering the laser cavity. Retro-reflection must be eliminated to achieve an ultra-stable light frequency. Such retro-reflection caused by an object in the path of the laser beam can be suppressed by optically isolating that object. However, the difficulty lies in detecting the presence of retro-reflection in the first instance and in locating the particular objects causing the retro-reflection.

SUMMARY OF THE INVENTION

A broad class of lasers have output radiations each containing a plurality of simultaneously functioning radiation modes, i.e. plurality of different, simultaneous frequencies of oscillation. These different modes can produce by interference one or more intermodal beat frequencies. An intermodal beat frequency, as that term is used herein, is a frequency resulting from the mixing or heterodyning of two or more laser radiation modes. While the basic light frequencies per se are far too high to detect and handle electronically, an intermodal beat frequency will often fall in a range which can be detected and handled by conventional electronic components and circuitry.

An object of the present invention is to provide a very high degree of laser frequency stability in a comparatively inexpensive and compact instrument, using the phase properties of an intermodal beat frequency for control. The invention achieves this object by sensing changes in phase of an intermodal beat frequency and generating an electric signal as a function of such change, and applying such signal to transducers which control one or more laser cavity parameters which in turn control the fundamental radiation frequencies of the laser.

Another object of the invention is to provide an extremely tight phase-locked relation between the intermodal beat frequency and a reference frequency thereby allowing a very high servoloop gain. Another feature of the invention is a phase offset relation introduced to eliminate phase hunting noise.

A further object of the invention is to enable controlled variation or tuning of the laser light frequency. This object is achieved by providing means structured for user controlled selection and variation of a reference frequency.

A still further object of the invention is to provide an easily discernable means to evaluate the presence of retro-reflection and to locate the sources thereof in a simple and inexpensive manner.

The invention possesses other objects and features, some of which will be set forth in the following description of the preferred form of the invention which is illustrated in the drawings accompanying and forming part of this specification. It is to be understood, however, that variations in the showing made by the drawings and description may be adopted within the scope of the invention as set forth in the claims.

BRIEF DESCRIPTION OF THE DRAWINGS

FIGS. 5a–e are graphs showing the waveforms at the corresponding points a–e in FIG. 2.

FIGS. 6a–b are graphs showing an illustrative input waveform (a) to the phase sample-and-hold circuit of FIG. 2 and the corresponding output waveform (b).

FIGS. 7a–d are graphs showing the system behavior as lock is acquired. Waveform (a) is the output of the sample-and-hold sampling capacitor and (b) is the corresponding waveform applied to the means for controlling the light frequency. Waveform (c) shows the output of the sample-and-hold sampling capacrtor when the pullup rate is reduced, and (d) shows the corresponding waveform applied to the means for controlling the light frequency.

DETAILED DESCRIPTION OF PREFERRED EMBODIMENTS

Figure 1:
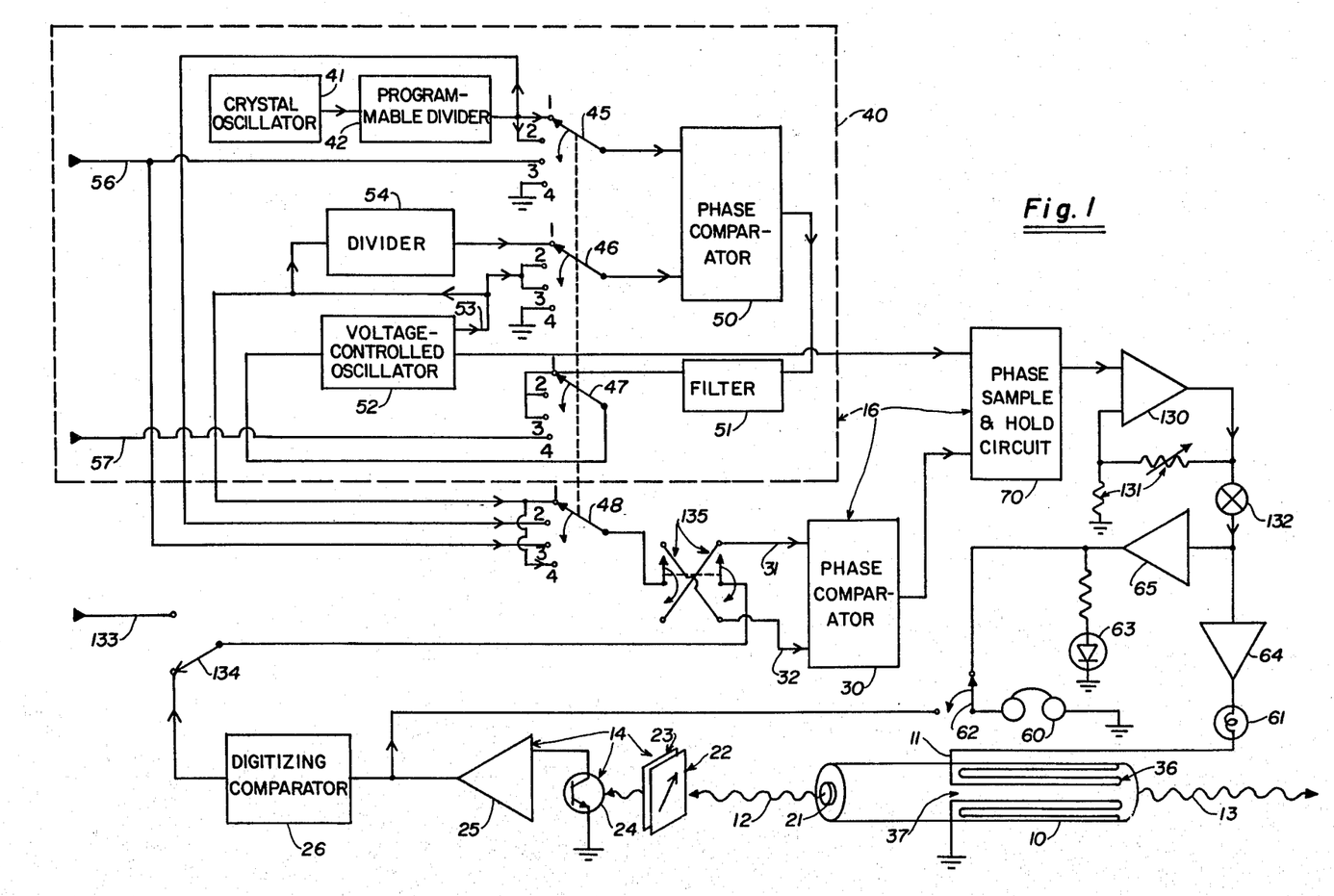
FIG. 1 is a block diagram of the apparatus of the present invention operatively associated with a transverse Zeeman laser.

The method and apparatus of the present invention are adapted for use with a laser, designated generally by 10, having output radiation including an intermodal beat frequency as herein defined and for use with means 11 responsive to an electric signal for controlling the light frequency of the laser, see FIG. 1.

Examples of lasers with which the present invention may be practiced are as follows. Some laser tubes, operating in a transverse magnetic field of a magnitude such that the Zeeman splitting is approximately equal to the difference in frequency of adjacent cavity modes, will generate two orthogonally polarized radiation modes having an intermodal frequency difference on the order of several hundred kiloHerz. Other laser tubes having appropriate length and operating in zero magnetic field will exhibit three of more radiation modes. Adjacent modes will combine in pairs to produce beat frequencies, which in turn will mix to yield a third, lower beat frequency that provides the intermodal beat frequency utilized in the present invention. These examples are only for purposes of illustration and are not intended to limit the scope of the invention or the nature of the lasers with which it may be practiced.

In FIG. 1 the laser output radiation is represented by the wavy lines 12 and 13 emanating from the ends of the laser 10. The laser control apparatus of the present invention comprises, briefly, radiation responsive, electric signal generating means 14 adapted for operative association with the laser output radiation 12 for providing an electric signal, sometimes referred to herein as the active signal, having a frequency $f_a$ as a function of the intermodal beat frequency, and means indicated generally at 16 for sensing changes in phase of the electric signal and providing a second electric signal varying as a function thereof, the means 16 being adapted for connection to the electric signal responsive means 11. An electric signal with frequency $f_a$ equal to the beat frequency or in scaled relation thereto can be derived in a well known manner from output radiation 12 leaking through the slightly transmissive end mirror 21 at the rear of the laser 10. Means 14 here comprises linear polarizer 22 oriented with its transmission axis inclined at an angle of 45° to the optic axis of quarter wave plate 23, photo transistor 24 for detecting the beat signal in the radiation emerging from quarter wave plate 23, and amplifier 25. The means 16 preferably comprises phase comparator means 30 connected to the radiation responsive means 14 for receiving the active signal at input 31, and being adapted for connection to a reference signal at input 32, all of the means 11, 14 and 30 being connected to phase lock the active signal of frequency $f_a$ to the reference signal of frequency $f_r$.

With the low cost and ready availability of digital integrated circuit components, it is desirable to realize the invention with digital circuitry. The embodiment of FIG. 1 thus includes digitizing means 26 for digitizing the electric signal from generating means 14. The means 26 is connected to receive the active signal from amplifier 25 and produces therefrom a digital two-logic state signal with frequency related to and preferably equal to the active signal frequency. Means 26 is preferably provided by an amplitude comparator, which generates a pulse having a sharp leading edge whenever the amplitude of the input signal to comparator 26 is greater than a fixed magnitude. Other known circuits, such as a Schmitt trigger, may also be used to convert the active signal to a train of logic pulses.

A desirable phase comparator means for use with the present invention is the so-called edge-controlled phase comparator. The output of such a phase comparator has a state which is controlled by the leading edges of the signals arriving at its inputs. Available from many manufacturers in integrated-circuit form, this type of phase comparator is commonly used in FM demodulators, frequency synthesizers, and the like. In such applications the phase comparator normally operates with the input signals in phase. However, when the leading edges of the input signals arrive nearly simultaneously with a phase difference very close to 0°, internal coupling introduces the phenomenon of phase pulling. Here, one signal effectively pulls the phase of the other slightly so that the phase comparator is unable to distinguish which leading edge arrived first. Consequently the phase comparator produces no change in its output signal as the input signal phase difference varies about 0° within certain small limits. In a phase-locked servo-loop such a zero-phase dead zone leads to an error in the phase comparator output signal known as zero-phase hunting noise. While a small amount of phase pulling may be tolerable, and even desirable in some servo applications, in the present use it results in an amount of zero-phase hunting noise that considerably exceeds the phase noise intrinsic to the operation of the laser. To avoid the zero-phase hunting noise when phase comparator 30 is of the edge-controlled type, the above-described phase lock is effected with the leading edges of the active and reference signals at inputs 31 and 32 having a phase difference considerably exceeding the zero-phase dead zone limits. The phase relation between the leading edges when the system is in its phase-locked state is determined in a manner described hereinbelow.

In order to avoid a multiplicity of lock points of the control apparatus, it is desirable to prevent the active and reference signals from locking with their frequencies in harmonic relation. To achieve this purpose phase comparator means 30 will advantageously include a comparator of the edge-controlled type having a substantially infinite capture range. That is to say, the ratio of input frequencies over which the comparator affords a phase lock is very large. Such a phase comparator is the broadband, digital memory type disclosed in U.S. Pat. No. 3,714,463.

To obtain a fast, responsive correction to frequency excursions of the laser light frequency at economical cost, means 11 for controlling the light frequency is desirably provided by a direct electrothermal transducer comprising electrical conductor 36 fixed to wall 37 defining the laser resonant cavity, conductor 36 being in a form and having a coefficient of thermal expansion functioning to change the light resonant frequency of the laser cavity as a function of current in the conductor 36. Preferably conductor 36 will be secured to wall 37 to provide a conduction path substantially parallel to a dimension of the cavity determining its resonant frequency. A direct electrothermal transducer suitable for use with the present invention is disclosed in my co-pending patent application Ser. No. 79,324, filed Sept. 27, 1979 now U.S. Pat. No. 4,293,223. The transducer disclosed therein responds comparatively rapidly to a wide range of frequency excursions. A fast response time is desirable in the servo loop, as it permits a higher-frequency cutoff, thereby reducing phase shifts in the loop. Other fast transducers, such as piezoelectric transducers, may also be used. Since many fast transducers, however, can control the laser frequency only over a limited range, means 11 may comprise two or more control elements for separate control of larger and smaller changes in the optical path length for longer or shorter-term frequency corrections.

An ultrastable laser as achieved with the present invention has a wide range of application, in which it is sometimes called upon to provide an ultrastable single-frequency standard and sometimes to provide a tunable range of frequencies. In the present invention the laser light frequency is stabilized at a frequency controlled by the frequency of the reference signal. To meet the range of demand placed upon the laser in its various applications, the control system may advantageously include means 40 providing the reference signal and structured so that a user may control selection of the reference signal frequency. For rock-solid stabilization of the laser light frequency, reference signal means 40 comprises crystal-controlled oscillator 41, the signal from which may be fed directly to phase comparator 30 or is preferably scaled down by frequency divider 42 to provide a range of reference frequencies. In the embodiment of FIG. 1 this reference signal is obtained when switch means 45–48 are in position two. A larger plurality of reference signals may be obtained from crystal oscillator 41 by well known frequency synthesis techniques. When switch means 45–47 are in position one, the output of frequency divider 42 is connected to an input of phase comparator 50, the output of which is connected through low-pass filter 51 to the input of voltage-controlled oscillator (VCO) 52. The VCO output 53 is connected to a second input of phase comparator 50 through frequency divider 54, thereby forming a phase-locked loop. In this manner a reference signal is provided at VCO output 53 which is a rational fraction of the crystal oscillator frequency as determined by the division ratios of frequency dividers 42 and 54. This synthesized reference signal is applied to phase comparator 30 when switches 45–48 are in position one. In some applications it may be desirable to provide an external reference frequency. For this purpose terminal 56 for receiving an external signal is connected directly to an input of phase comparator 30 when switches 45–48 are in position three. For example, where it is desired to have the highest possible stability, along with an extraordinarily broad range of reference frequencies, the user may connect to terminal 56, a sourse such as the Rockland Programmable Frequency Synthesizer described in U.S. Pat. No. 3,735,269. In some applications it is desirable to sweep the laser light frequency slowly over a small range. For this purpose reference signal means 40 will advantageously afford a continuous sweeping of the reference signal frequency. This is accomplished in the embodiment of FIG. 1 when switches 45–48 are in position four. Output 53 of VCO 52 is connected directly to an input of phase comparator 30, and the input of VCO 52 is connected to terminal 57 for receiving an external control voltage. Applying a variable voltage to terminal 57, a user may effect a controlled sweep of the reference signal frequency, and hence, within limits defined by the Doppler gain profile, the light frequency itself. With switches 45–48 ganged together means 40 provides facile and unencumbered selectivity of the reference signal and thereby a control of the laser light frequency heretofore unavailable in a single instrument.

To achieve rock-solid stabilization of the laser light frequency, it is necessary to consider the effect of laser light reflected or scattered back into the laser cavity by objects in the path of especially the main beam 13. For example, a one percent retro-reflection, as such radiation is herein called, can produce a shift in a laser operating frequency of several hundred kilohertz to five Megahertz or more. For high stability it is imperative that the sources of retro-reflection be indentified. Once indentified, a source can be optically isolated by the use of quarter-wave plates and polarizers, or a Faraday isolator. It is well known that radiation emitted or reflected by a moving object will undergo a shift in frequency, known as the Doppler shift. Thus, if an object in the path of the beam is a source of retro-reflection, then imparting a slight motion to that object, for example by touching it, will produce a Doppler shift in the retro-reflection. Within the laser cavity the laser output radiation and Doppler-shifted retro-reflected radiation will interfere to produce a retro-reflection beat frequency. In the laser control system of the present invention, the radiation responsive, electric signal generating means 14 is adapted for operative association with both the laser output radiation and Doppler-shifted retro-reflected radiation and provides an electric signal having a frequency as a function of the last-named beat frequency. If the motion imparted to the retro-reflecting object is sufficiently slow, the retro-reflection beat frequency will lie in the audio to sub-audio range. Means 14 will then preferably provide an electric signal having a frequency equal to the audio to sub-audio beat frequency. Alternatively, for faster motion of the retro-reflecting object and a higher retro-reflection beat frequency, means 14 may provide an electric signal having a frequency scaled down to the audio to sub-audio range. Because of the high sensitivity of the human senses, the present invention includes indicator means connected to electric signal generating means 14 and providing a user-discernable signal when the electric signal provided by means 14 has a frequency component in the audio to sub-audio range. The indicator means may be an auditory transducer, such as head phones 60, providing an audible signal when the electrical signal frequency is in a user-discernable audio range. When the electric signal frequency is in the sub-audio range, so that it will not generally be discernable in the head phones 60, it will fall into a visually resolvable range. To detect this signal, the indicator means here comprises an electric lamp 61 providing a visually varying signal.

For sufficiently strong retro-reflected radiation the beat signal can be detected directly at the output of means 14 when switch 62 is directed thereto. Normally, however, still significant signals will be drowned out by amplitude noise generated by the laser itself. Most of this noise is due to amplitude fluctuations of the laser light intensity, combined with a much smaller level of electronic instrument noise. It is advantageous, therefore, in the present invention to connect the indicator means to receive the output signal provided by phase comparator means 30. This output signal varies in accordance with the phase changes of the retro-reflection beat signal and is substantially unaffected by laser amplitude noise fluctuations. Indicator means connected in the latter manner provides an extraordinarily sensitive indicator of retro-reflection. Head phones 60 may be connected by switch 62 either directly to the output of means 14, when noise interference is not dominant, or to receive the output of phase comparator means 30, where greater sensitivity is desired. Light-emitting diode 63, connected to receive the output signal of phase comparator means 30, also provides a visual indication of the presence of a retro-reflection beat signal. The indicator lamps 61 and 63 are here driven by operational amplifiers 64 and 65 respectively.

With the apparatus of the present invention the sources of retro-reflection altering the light frequency of a laser may be identified by the following extremely sensitive method: selectively causing to move objects in the path of the output radiation of the laser; generating an electric signal having a frequency as a function of the beat frequency between this output radiation and Doppler-shifted retro-reflected radiation; and providing a user-discernable signal when the last-named electric signal frequency is in a user-discernable audio to sub-audio range.

To provide a smooth signal accurately representing the phase changes of the intermodal beat frequency, phase comparator means 30 would normally have to include a filtering circuit. It is well known from the theory of phase-locked feedback systems that a phase lag of 90° is inherently introduced into the feedback loop. Hence, the phase lag margin at unity gain available to additional loop circuit elements is limited to 90°. Thus even simple filtering of the phase comparator output signal without a compensating phase lead network can introduce excessive phase lag into the loop. This is especially the case where means 11 has an inherent phase lag. To minimize the lag introduced when converting the phase comparator output signal to a usable voltage, phase comparator means 30 cooperates with phase sample-and-hold circuit 70 providing an electric signal at an output thereof as a function of the difference in phase of the active, electric signal from means 14 and the reference signal. Sample-and-hold circuit 70 will introduce a minimum of phase lag into the loop when it is structured to update the output signal at substantially each period of the reference signal.

Figures 2, 3, 4:
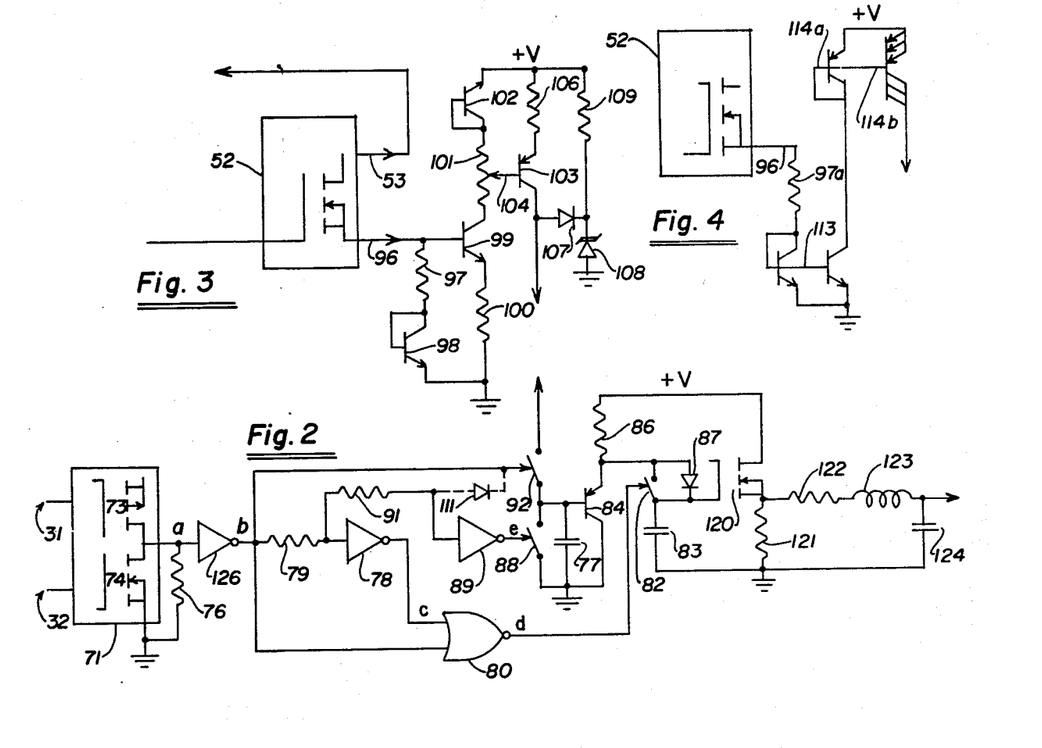
FIG. 2 is a schematic diagram of a phase sample-and-hold circuit constructed in accordance with the invention.
FIG. 3 is a schematic diagram of means providing a capacitor-charging current for the circuit of FIG. 2.
FIG. 4 is a schematic diagram of an alternative to the means of FIG. 3.

Several phase comparators commercially available in integrated circuit form may be adapted for use with the present invention. These comparators typically have an output stage as represented schematically at 71 in FIG. 2. Depending upon the sign of the frequency difference $f_a-f_r$, either the p-driver circuit 73 or the n-driver circuit 74 will be energized for a duration depending upon the phase difference between the two input signals to comparator means 30. For definiteness the p-driver driver 73 and n-driver 74 are shown in FIG. 2 as metal-oxide-semiconductor field-effect transistor (MOSFET) devices. A pulldown resistor 76 is connected to the output stage 71 of phase comparator means 30. For all active signal frequencies $f_a$ less than the reference signal frequency $f_r$, the output signal will be a digital signal at a logic 0 state since only the n-driver will be energized under these circumstances. For the signal frequency $f_a$ greater than the reference frequency $f_r$ the p-driver is energized to raise the output to a logic 1 state for a duration proportional to the phase difference between the input signals. The signal at the output of phase comparator means 30 is then a digital signal having a positive-going duty cycle dependent on and representative of the phase difference between the two signals applied as inputs thereto. When such a phase comparator is adapted for use with the present invention, the digital signal output therefrom serves as an intermediate signal fed to a following sample-and-hold circuit providing the electric signal to be applied to means 11. At each period of the intermediate digital signal the sample-and-hold circuit will advantageously update the last-named electric signal in proportion to changes in the duty cycle of the intermediate signal so as to achieve extraordinarily fast response.

A preferred embodiment of a sample-and-hold circuit providing such periodic updating is shown in FIG. 2. This circuit includes a capacitor 77 to be charged during a sampling interval, which in the present invention is advantageously taken to be substantially the aforementioned duty cycle. The input capacitance of inverter 78 and resistor 79 coupled thereto co-function as delay means and provide as an input to inverter 78 a delayed signal lagging the signal applied at point b as an input of the sample-and-hold circuit. The duration of the delay is determined by the resistance of resistor 79. NOR gate 80 is coupled to the output of inverter 78 and to node b, thereby to receive the input signal applied at point b and the inverted delayed input signal as inputs. The output of NOR gate 80 is coupled to controlled switch means 82, provided for example by an analog switch, to control its opening and closing. Means for reading the voltage developed across capacitor 77 comprises capacitor 83 and a common-collector transistor circuit including transistor 84, the base and collector of which are coupled across capacitor 77. The emitter of transistor 84 is coupled to bias potential $+V$ through pullup resistor 86. The emitter is also coupled through diode 87 to storage capacitor 83 and directly to capacitor 83 when switch means 82 is in its closed position. When switch means 82 is closed the potential across capacitor 83 will be driven toward the potential across capacitor 77 at a rate determined by pullup resistor 86. In this manner the potential developed across capacitor 77 is transferred to storage capacitor 83 during an interval controlled by the output signal from NOR gate 80. Capacitor 77 is connected to ground for discharging thereof by the closed positon of controlled switch means 88. The input of inverter 89 is coupled through series resistors 91 and 79 to the input node b, and the output is coupled to switch means 88 to control the opening and closing thereof. The input capacitance of inverter 89 and resistor 91 coupled thereto co-function to provide a second delayed signal lagging the first-named delayed signal by an interval determined by the resistance of resistor 91. As discussed hereinbelow, this further delay assures that the discharge of capacitor 77 will not be initiated until after capacitor 77 is read. Controlled switch means 92 in its closed position couples capacitor 77 to a charging-current source. Input node b is coupled to switch means 92 to control the opening and closing thereof. In the absence of pulses, i.e., for $f_a<f_r$, so that the signal at node b goes to logic 1 and closes switch 92, diode 87 conducts to give a maximum output signal from source follower 120. The circuit of FIG. 2 includes preferably an inverter 126 connected between the output a of the phase comparator 71 and the input b of the sample-and-hold circuit. This inverter serves to sharpen up the trailing edge of the pulses at point a and thereby provides for more precise trouble-free gating of switch means 82, 88, and 92 in the sample-and-hold circuit.

The charging current applied to capacitor 77 determines the volage developed thereacross and consequently the voltage output of the sample-and-hold circuit when the apparatus is in its phase-locked condition. Thus, by determining the level at which means 11 is driven for maintaining lock, the charging current applied to capacitor 77 also determines the phase offset between the input signals to phase comparator means 30 in the phase-locked condition. A given locking phase offset will be represented by a certain duty cycle of the digital signal input to the sample-and-hold circuit. Generally, a duty cycle expressed as a percentage of one period will typically represent a phase offset equal to the corresponding percentage of 360°. Thus, for example, when the phase difference is 180° and the corresponding duty cycle is 50 percent, capacitor 77 will accumulate a charge for one-half of a period. In order that capacitor 77 develop a given voltage for pulses of a specified duty cycle independently of the reference frequency, the charging current source connected to capacitor 77 by switch means 92 is made to provide a charging current proportional to the frequency of the reference signal. Such a charging current is particularly desirable for maintaining a constant locking phase offset in laser applications that call for sweeping or switching of the reference frequency. A widely used voltage-controlled oscillator develops a frequency-controlling current that controls the charging and discharging of a capacitor between fixed voltage limits, thereby controlling the oscillator frequency in a proportional manner. The present invention includes charging-current means comprising a voltage-controlled oscillator having such a frequency-controlling current and adapted for connection to the reference signal; and means connected thereto and providing the charging current substantially proportional to the frequency-controlling current of the oscillator. In the embodiment of FIG. 1 the phase sample-and-hold circuit 70 is connected to receive the frequency-controlling current developed within VCO 52. Filter 51 serves to establish a frequency-controlling current with a minimum of high-frequency noise and low frequency hunting effects. FIG. 3 shows a low-noise circuit connected to VCO 52 and providing a charging current proportional to frequency. Resistor 97 controlling the VCO current is connected to ground through transistor diode 98. The output end of resistor 97 is connected to the base of transistor 99, the emitter of which is connected to ground through resistor 100. The collector current of transistor 99 generates a voltage drop in the load resistance combination of resistor 101 and transistor diode 102. A fraction of this voltage drop is fed to the base of transistor 103 through potentiometer tap 104. The emitter of transistor 103 is connected to positive bias potential +V through resistor 106. The output current sourced by the collector of transistor 103 will be a linear function of the VCO frequency-controlling current in resistor 97. The circuit of FIG. 3 includes at its output a clamping circuit comprising clamp diode 107, Zener diode 108 and resistor 109. This clamp circuit sets the maximum voltage developed across capacitor 77 when switch means 92 remains in its closed position. The sample-and-hold circuit may additionally include diode 111, which serves to assure a reference-frequency-independent phase output when the frequency-controlling current output of VCO 52 has an exactly linear dependence on frequency. The typical sligh non-linear dependence found generally can be offset by eliminating diode 111 and controlling the delays introduced through inverters 78 and 89. An alternative means providing a charging-current source is shown in FIG. 4. Connected to VCO output 96 through resistor 97a, this circuit comprises in standard fashion a pair of complementary current mirrors 113 and 114a-b. A frequency-proportional source current is thereby derived at the multiple collectors of transistor 114b in current mirror 114. The multiple collectors and emitters of transistor 114b act to multiply the available source current.

In the sample-and-hold circuit of FIG. 2 the potential across capacitor 83 is read by a MOSFET source follower comprising MOSFET 120 and resistor 121. This is then followed by a low-pass filter comprised of resistor 122, inductor 123 and capacitor 124 for removing very high frequency switching transients arising from capacitive coupling in the switch means 82, 88 and 92.

Figure 5:
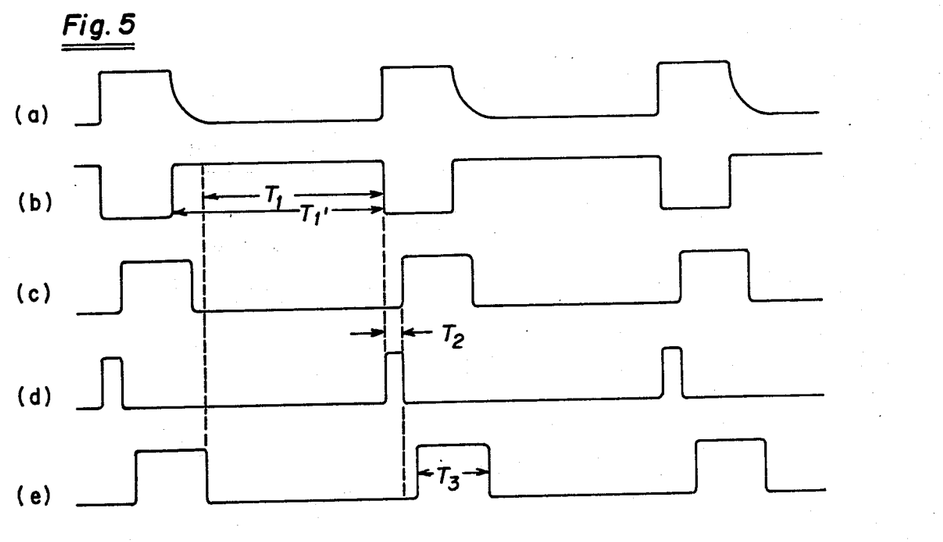

The sample-and-hold circuit of FIG. 2 operates in the following manner to convert the duty cycle information at its input to a very smooth voltage signal at its output and to update the voltage output signal at each pulse of the digital input signal. The pulse wave forms at the points a-e are shown in FIG. 5 where the delays in wave forms c and e and the width of the pulse in wave form d have been greatly exaggerated for clarity. Wave form a shows a typical intermediate digital pulse train, and wave form b shows the same pulse train after passing through inverter 126. Switch means 82, 88 and 92 are gated to close when their respective digital control signals are at the logic level 1. Thus, the logic 1 of wave form b causes switch means 92 to close, thereby allowing the charging current to pass therethrough. When switch means 92 first closes, wave form e is at its logic level 1, so that the charging current passes to ground. When wave form e switches from logic 1 to logic 0, switch means 88 opens and capacitor 77 begins to charge. The charging of capacitor 77 is terminated when wave form b goes from logic 1 to logic 0. NOR gate 80 provides a digital signal having a logic 1 only when the wave form b and the delayed wave form c are at logic 0's. Thus, simultaneously with the opening of switch means 92 and the termination of the capacitor charging current, the pulse from NOR gate 80 closes switch means 82, thereby causing any change in the potential across capacitor 77 from that resulting from the previous pulse to be read onto capacitor 83. The closing of switch means 88 and the consequent discharge of capacitor 77 is then activated by the second delayed wave form e. It is highly desireable that wave form e lag wave form c slightly to assure that the discharging and reading of capacitor 77 will not overlap. Thus, capacitor 77 will charge during the interval $T_1$; it will be read during the interval $T_2$ immediately following $T_1$; and it will discharge during the interval $T_3$ slightly lagging the interval $T_2$. In practice the delays in wave forms c and e are quite small. For a pulse repetition rate of 500 kilohertz a read interval $T_2$ of 0.1 microseconds has been found adequate. When diode 111 is included in the sample-and-hold circuit, capacitor 77 will charge during the period $T'_1$, and the trailing edge of wave form e will be advanced to open switch means 88 simultaneously with the closing of switch means 92. The sample-and-hold circuit of FIG. 2 thus always updates the output voltage signal once every period of the input digital signal with no filtering except for the very high frequency switching-transient filter, which introduces negligible phase lag at the working frequencies.

Figure 6:
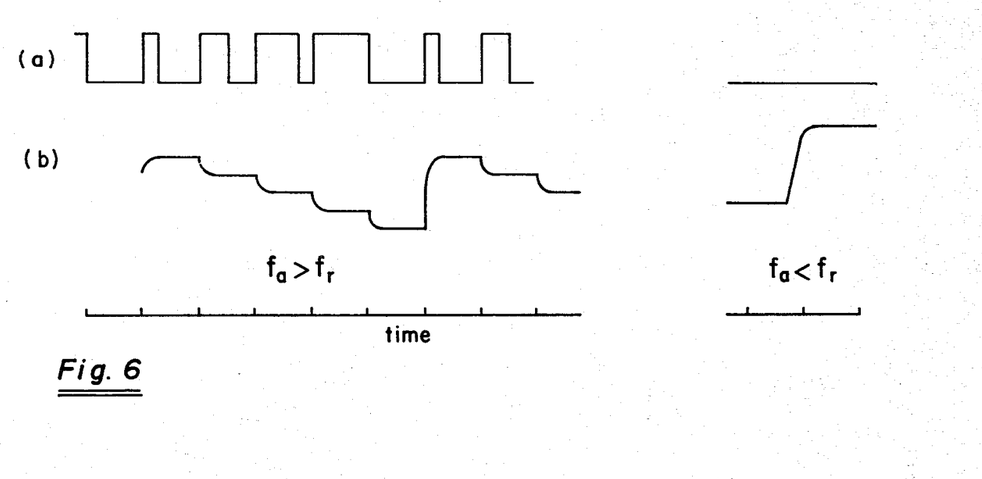

The wave forms of FIG. 6 illustrate the operation of the sample-and-hold circuit of FIG. 2. Wave form (a) represents a digital signal applied point a of the sample-and-hold circuit, and wave form (b) represents the corresponding voltage output provided by the sample-and-hold circuit. The left-hand portion of wave form (a) represents the output of phase comparator 30 if active signal frequency $f_a$ were to have a fixed value greater than reference frequency $f_r$ so that their phase difference grows at a constant rate. The voltage levels of wave form (b) represent the negative-going duty cycle of the last preceding period of wave form (a). The periods of these wave forms are marked on the time axis.

The right-hand portion of wave form (a) represents the case when the input signal frequency $f_a$ is less than the reference frequency $f_r$. Here the wave form (a) remains in its logic 0 state. The response of the sample-and-hold circuit is such that capacitor 77 charges at a constant rate. When the circuit of FIG. 3 supplies the charging current, capacitor 77 will charge to a level determined by diodes 107 and 108. Capacitor 83 will charge to a similar level due to the action of diode 87 and transistor 84. The right-hand portion of wave form (b) shows the sample-and-hold output voltage as the potential across capacitor 83 rises to its limiting level representative of a phase relation with $f_a<f_r$ from an intermediate level representative of a phase relation with $f_a>f_r$.

To lock the control signal more tightly to the reference signal, and consequently to limit more the frequency excursions of the laser light frequency, amplifier 130 is connected to receive and amplify the signal from sample-and-hold circuit 70 before it is applied to means 11. Further advantage can be gained when amplifier 130 has a transfer characteristic comprised of three regions: in a first region the amplifier output signal is substantially at its lowest value; in a second region the amplifier output signal varies in linear proportion to the amplifier input signal; and in a third region the amplifier output signal is substantially at its highest value. Such a transfer function, for example, is provided by a transistor amplifier, where the first and third regions correspond to the saturation and cutoff limits of the transistor and the second region corresponds to the normally active transistor region. Amplifier 130 is biased to operate in the second region when the signal from means 14 is phase-locked to the reference signal, and the amplifier operating bias window, defined to be the range of amplifier input signals over which the amplifier operates in its second region, is chosen to be relatively small. When the input signals to phase comparator means 30 differ in phase by more than a critical amount determined by the amplifier bias window, the output of amplifier 130 passes either into its first, low-voltage region or into its third, high-voltage region, depending upon the sign of the phase difference. In this way, for a phase difference greater than a critical magnitude means 11 is driven toward either its extreme of optical path length expansion or its extreme of optical path length reduction. For the direct electrothermal transducer 36 illustrated in FIG. 1 resonant cavity wall 37 is driven toward its extreme of expansion or contraction when the phase difference is outside the critical range determined by the amplifier bias window. This arrangement is found to provide for fast acquisition of lock without ringing. Amplifier 130 includes adjustable resistive feedback loop 131 to change the loop gain and thereby the width of the operating phase window and may also be structured to supply a phase lead to compensate for the phase lag introduced by means 11. Switch 132 is a lock-slope switch, which reverses the phase of the signal applied to means 11 for driving the cavity length in the direction of stable operation.

Figure 7:
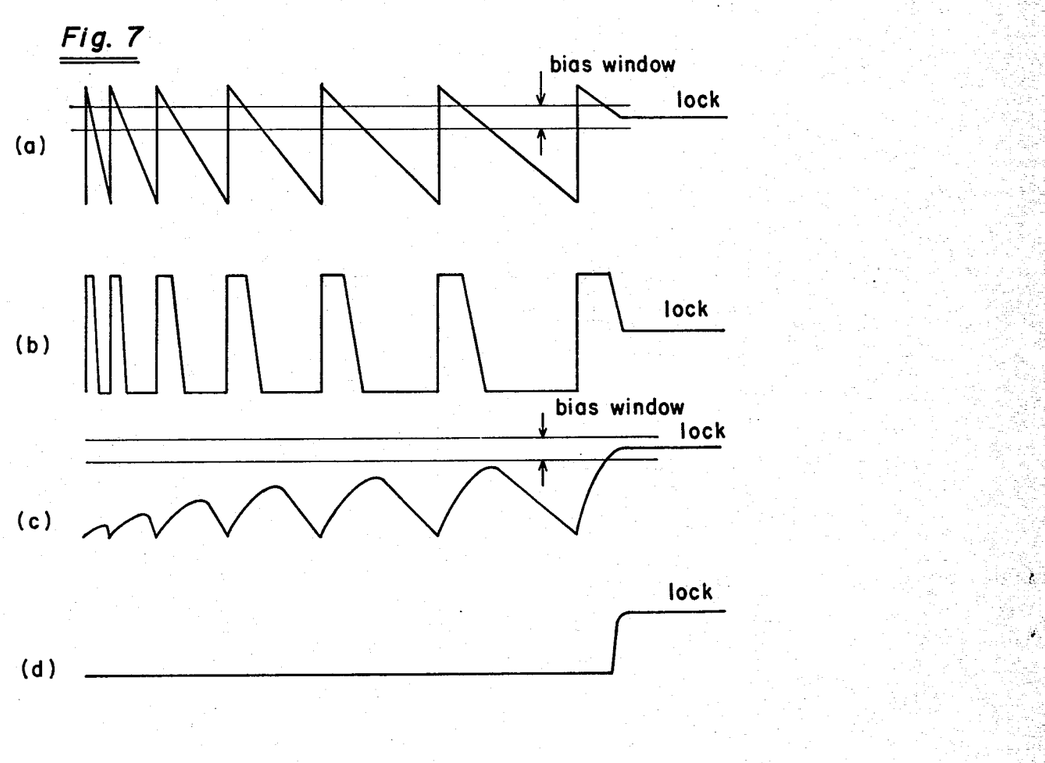

FIG. 7 shows the behavior of the laser control apparatus for an active signal frequency $f_a$ greater than the reference frequency $f_r$ as the frequency $f_a$ is gradually reduced until lock is acquired. Wave form (a) represents an idealized voltage output from the sample-and-hold circuit with a very low pullup resistance 86 and consequently a high pullup current tending to equalize the potentials across capacitors 83 and 77. When the sample-and-hold output voltage exceeds the amplifier bias window limits, the amplifier is driven to its extreme of maximum output or of complete cut-off. Wave form (b) depicts the amplifier output voltage which is applied to means 11 for expanding or contracting the laser cavity optical path length. Wave form (c) represents the sample-and-hold output voltage in the opposite extreme of a very high pullup resistance 86 and hence a low pullup rate. The high pullup resistance can lead to a reduction in the lock-acquisition time and an increased range in which the locking phase offset may be selected. Wave form (d) represents the output of amplifier 130 corresponding to wave form (c).

When the present invention is practiced with a transverse Zeeman laser as illustrated herein, the output beam will include two orthogonally polarized components with slightly different frequencies $\nu_\pi$ and $\nu_\sigma$. To obtain a single-frequency component displaying the greatly enhanced stability attainable with the present invention, the other component may be removed by a linear polarizer. The intensity of the remaining component will generally exhibit a small modulation at the intermodal beat frequency having an amplitude dependent upon the particular laser cavity and the angular relation between the mirror birefringent axes and the direction of the applied magnetic field. However, for an optimal angular relation the modulation will be a minimum. Thus, when practicing the invention with a transverse Zeeman laser, it is desirable to include means for relative rotary motion of the laser cavity, about the cavity longitudinal axis, and the applied magnetic field. The relative rotary motion may be realized either by rotating the laser cavity by means of a rotatable support therefor or by rotating the magnetic field by means of quadrature flux steering coils or the like.

Figure 8:
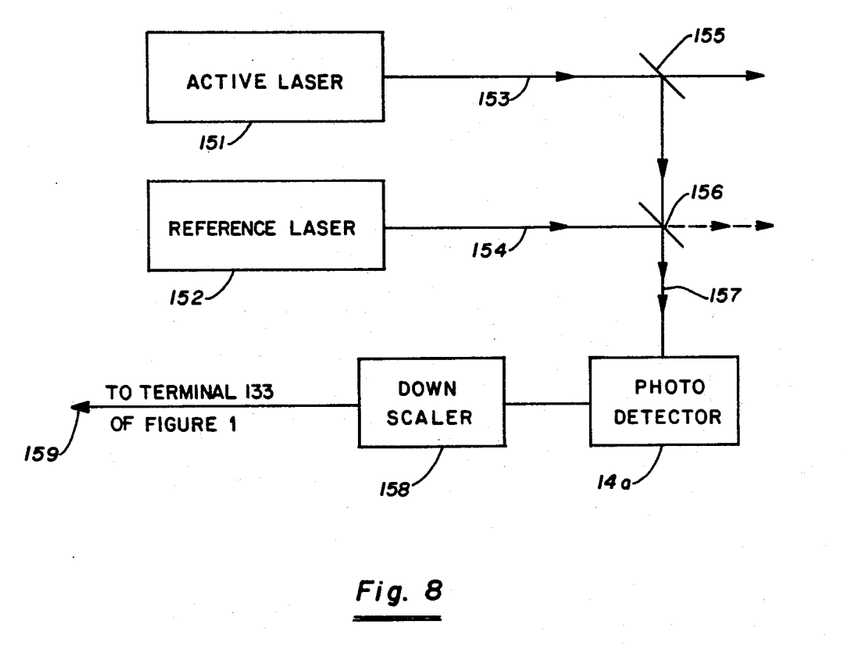
FIG. 8 is a schematic diagram of a modified form of the invention.

An application of the invention is illustrated in FIG. 8 wherein the method and apparatus of the present invention is used to phase-lock the operating frequencies of two lasers 151 and 152 relative to each other so as to generate a predetermined offset frequency. Laser 151 is referred to as a "reference" laser which is considered to have a fixed frequency light output; and laser 151 is referred to as an "active" laser meaning that its frequency can be controlled as with the showings of the present invention. The light output 153 of laser 151 is mixed with light output 154 of laser 152 by means of beam splitters 155, 156 and the combined light output 157 containing the desired beat frequency is directed onto photodetective means 14a. Preferably, the output of means 14a is applied to a down scaler 158 having its output 159 connected to one of the inputs of the phase comparator 30 disclosed in the first described embodiment of this invention. For this purpose input 31 of phase comparator 30, see FIG. 1, is connected through a phase reversing switch 135 and switch 134 to a terminal 133 which is adapted for connection to the output 159 of down scaler 158. In this arrangement laser 10 of FIG. 1 becomes the active laser 151 of FIG. 8. It will operate so that its light frequency is offset from that of the reference laser light frequency by an amount equal to the down-scaling factor times the phase detector reference frequency. Whether the generated light frequency is above or below that of the reference depends on the position of the phase reversal switch 135. The system is similarly applicable to provide a controlling signal for an active laser which may be a continuous wave dye laser or other laser external to the system of FIG. 1. Such a laser, however, must have a transducer that will control to output light frequency. In this case such a transducer could be driven, for example by the output of amplifier 65 (FIG. 1), easily available at the head phones output.

What is claimed is:

1. A frequency control apparatus for controlling the frequency of light output of a single laser having output radiation in two or more modes, said modes producing an intermodal beat frequency, and electric signal responsive first means for controlling the laser resonant cavity length and thereby said frequency of output from said laser, comprising:

second means for receiving said receiving said radiation in a fixed plane of polarization for detecting said intermodal beat frequency and conversion thereof into a first electric signal having a frequency as a function of said beat frequency;

third means for providing a reference frequency second electric signal;

phase comparator fourth means having a first input terminal connected to said second means for receiving said first signal as one input thereof, and having a second input terminal connected to said third means for receiving said second signal as a second input thereof;

said phase comparator fourth means having an output providing an electric third signal varying as a function of the phase difference between said first and second signals and beign connected to said first means for phase locking said first and second signals.

2. The apparatus of claim 1 wherein said fourth means is edge-controlled and digital and provides output states controlled by edges of said first and second signals and wherein said phase locking is effected with said edges having a phase difference exceeding zero-phase hunting noise limits of said apparatus.

3. The apparatus of claim 2 wherein said fourth means has a substantially infinite capture range and provides an intermediate digital fourth signal having a duty cycle controlled by a time difference between edges of said first signal and said second signal and comprising;

phase sample-and-hold fifth means connected to said fourth means and producing from said fourth signal said third signal which is a function of said duty cycle of each fourth signal pulse, to hold it, and to update it at the end of each such pulse.

4. The apparatus of claim 3 wherein, said fifth means comprises a first capacitor; and charging circuit sixth means connected to said first capacitor and formed to provide a charging current proportional to the frequency of said second signal, said first capacitor being further connected to said fourth means to permit charging of said first capacitor by said sixth means for substantially the duration of the duty cycle of said fourth signal to provide, for a given duty cycle of said fourth signal, an output substantially independent of said second signal.

5. The control apparatus of claim 4, and inverter seventh means coupled through first delay means to receive said fourth signal and produce as an output thereof an inverted fourth signal having a first time delay with respect to said fourth signal;

inverter eight means coupled through a second delay means to receive said fourth signal and produce as an output thereof an inverted fourth signal having a second time delay with respect to said fourth signal greater than said first time delay;

said first capacitor being connected to said sixth means by a first analog switch, said first analog switch being connected for actuation over substantially the duty cycle of said fourth signal, said first capacitor being further connected to ground by the closing of a second analog switch, said second analog switch being connected to said eighth means for actuation by said inverted fourth signal having said second time delay, said first capacitor being further connected through a buffer and a third analog switch having a parallel diode shunt to a storage capacitor;

gating means coupled for input by said fourth signal and said inverted fourth signal with said first time delay and coupled for output to said third analog switch, said gating means being formed to actuate said third analog switch during the presence of both said fourth signal and said inverted fourth signal with said first time delay; and said apparatus being formed and coupled for sequential charging of said first capacitor to a voltage by said sixth means, transfer of said voltage to said storage capacitor through said buffer and said third analog switch to provide third signal and then discharging of said first capacitor to ground by said second analog switch before the start of the next fourth signal pulse, and said diode shunt being formed to produce a maximum third signal in the absence of said fourth signal.

6. The apparatus of claim 1, wherein said first means comprises an electrical conductor affixed to a portion of said laser resonant cavity wall and having a coefficient of thermal expansion changing the light resonant frequency of said cavity as a function of current in said conductor.

7. The apparatus of claim 1, where said third means for providing a reference frequency second signal is formed for user-controlled selection of frequency of said second signal whereby said laser light frequency may be stabilized at a frequency controlled by the frequency of said second signal.

8. The apparatus of claim 1 wherein Doppler-shifted retro-reflected radiation from an object in motion in the path of said laser radiation impinges said second means and provides a phase modulation of said first signal;

said fourth means providing an amplitude modulation of said third signal responsive to said phase modulation, and a user discernable indicator means connected to said fourth means and responsive to said amplitude modulation.

* * * * *